United States Patent [19]

Katou et al.

[11] Patent Number: 4,616,545

[45] Date of Patent: Oct. 14, 1986

[54] CUTTER FOR A WELDING APPARATUS

[75] Inventors: Kazuo Katou, Okayama; Susumu Mizugami; Mamoru Tabuchi, both of Kurashiki; Masayuki Nakamura, Hyogo; Toshiyuki Kobayashi, Suita; Naotake Ritoh, Minoo, all of Japan

[73] Assignees: Kawasaki Steel Corporation; Mitsubishi Denki Kabushiki Kaisha, both of Japan

[21] Appl. No.: 669,326

[22] Filed: Nov. 8, 1984

[30] Foreign Application Priority Data

Mar. 11, 1983 [JP] Japan .................................. 58-41352

[51] Int. Cl.⁴ .......................... B26D 5/04; B23K 11/00
[52] U.S. Cl. .................................... 83/558; 83/560; 83/563; 83/859; 29/1 A; 72/446; 409/241
[58] Field of Search ................. 83/563, 558, 559, 560, 83/580, 611, 613, 556, 859; 409/241; 29/564.2, 564.7, 1 A; 72/238, 239, 446; 100/231

[56] References Cited

U.S. PATENT DOCUMENTS 3,389,627 6/1968 Morley .................................. 83/558
3,662,640 5/1972 Wrona .................................. 100/231

FOREIGN PATENT DOCUMENTS 2234224 1/1974 Fed. Rep. of Germany ...... 100/231
54-34956 10/1979 Japan .
430847 6/1935 United Kingdom .

Primary Examiner—Frank T. Yost
Assistant Examiner—Hien H. Phan
Attorney, Agent, or Firm—Leydig, Voit & Mayer, Ltd.

[57] ABSTRACT

A cutter for a welding apparatus for cutting a welding workpiece upon welding. In order to facilitate the positioning of the cutter during the movement of the cutter for the cutting operation and to make the entire apparatus small-sized, a shear frame is formed with substantially the shaped of a C, and the opposing portions of the C-shaped shear frame are connected by a connecting rod, enabling the reaction force during the cutting operation to be resisted by the shear frame itself.

10 Claims, 7 Drawing Figures

CUTTER FOR A WELDING APPARATUS

This is a continuation of Application No. PCT/JP84/00096 filed Mar. 8, 1984.

TECHNICAL FIELD

This invention relates to cutters for a welding apparatus and more particularly to a cutter for a welding apparatus which includes a shear frame associated with a welding apparatus supporting an upper blade and a lower blade and which is variable in position according to the cutting or welding operation on the workpiece to be welded.

BACKGROUND TECHNIQUE

FIGS. 1, 2 and 3 illustrate a conventional device of this type, in which a preceding steel strip 1a and a subsequent steel strip 1b which are welding workpieces are clamped by clamp dies 2a, 2b and clamp bars 3a, 3b. Thereafter, a C-shaped shear frame 7 supporting an upper blade 4 and a lower blade 5 and having a pin guide hole 6 is moved to a welding position shown in FIG. 2 by a shear frame moving cylinder 8. The clamp bars 3a, 3b are moved up and down by clamp cylinders 10a, 10b supported on the clamp supporting frame 9, thereby rigidly holding the preceding and subsequent steel strips 1a, 1b. The clamp supporting frame 9 is supported at its opposite ends by a pin support frame 11 and a clamp frame 12, and the clamp dies 2a, 2b are fixed on the pin supporting frame 11, the clamp frame 12, and a common base 13. On the top face of the common base 13 is a rail 14 for positioning and guiding the shear frame 7. The clamp bar 3a has fixed thereon a rail 15 on which a welding torch moves, and a laser welding torch 16 moves rightward in FIG. 1 during the welding operation.

Cutting of the welding workpieces is simultaneously achieved while holding the shear frame 7 at the welding position shown in FIG. 2 by cutting, in the manner shown in FIG. 3, the ends of the preceding and subsequent steel strips 1a, 1b with the upper and the lower blades. In order to resist the cutting reaction force during this cutting operation, a pin 17 mounted on the pin supporting frame 11 is inserted by a cylinder 18 into the pin guide hole 6 formed in the shear frame 7. Then, the cutting of the preceding and the subsequent steel strips 1a, 1b is achieved, and thereafter the shear frame 7 recedes back to the position shown in FIG. 1 by a shear frame moving cylinder 8.

Then, in the position in which the preceding steel strip 1a is moved to the left in FIG. 3 and in which the cut faces of the preceding and the subsequent steel strips 1a and 1b engage with each other without any gap therebetween, the laser welding torch 16 emits a laser beam while moving at a constant speed to the right in FIG. 1 to form a weld.

However, the conventional cutting device of the construction as described above has been disadvantageous in that, since the pin supporting frame 11 on which the pin 17 is secured and the shear frame 7 in which the pin guide hole 6 is formed are independent from each other, the precision positioning of the pin 17 and the pin guide hole 6 is extremely difficult. Furthermore, since the pin supporting frame 11 for resisting the cutting reaction force (about 70 tons with a thickness of 4.5 mm) is mounted on the common base 13, the pin supporting frame 11 is inevitably very large.

DISCLOSURE OF THE INVENTION

The present invention contemplates to eliminate the disadvantages of the conventional design, and provides a cutter for a welding apparatus in which the apparatus is small-sized by connecting the upper and lower jaw of the opening of a substantially C-shaped shear frame by a connecting rod, by arranging the connecting rod to be engaged by a lock pin, by facilitating the registration of the connecting rod and the lock pin, and by arranging the pin supporting frame 11 of the conventional design so that it need be large enough only to support the clamp supporting frame.

Thus, according to the present invention, the mechanism in which the reacting force for cutting is resisted is disposed on the shear frame itself, the accuracy of the mechanism consisting of the connecting rod, lock pin, etc. on which the cutting reaction is supported is easily obtained, and the assembly of the cutting device can be made with the shear frame alone, and another cutting operation may be achieved during the in-line operation of the welding apparatus, providing significant advantages.

BEST MODE FOR EMBODYING THE PRESENT INVENTION

Figure 1:
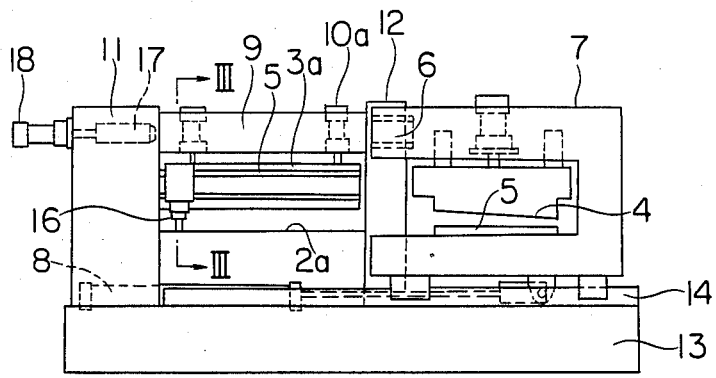
FIG. 1 is a front view of a conventional apparatus.
Figure 2:
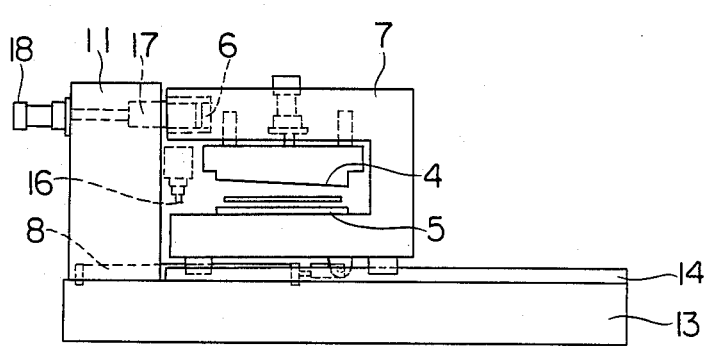
FIG. 2 is a front view of a main portion for explaining the operation.
Figure 3:
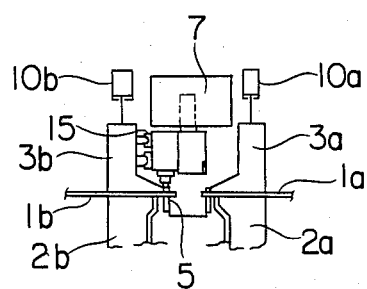
FIG. 3 is a view taken along line III—III of FIG. 1.
Figure 4:
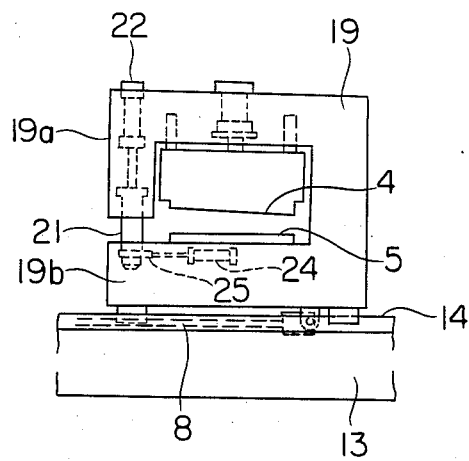
FIG. 4 is a front view of a main portion of one embodiment of the present invention.
Figure 5:
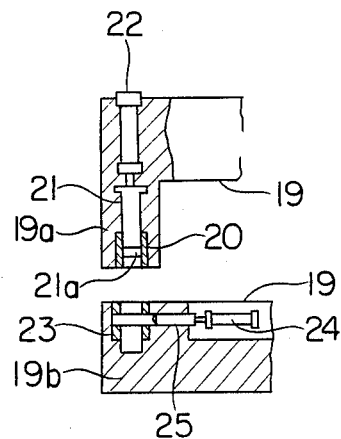
FIG. 5 is a sectional front view of a portion.

The present invention will now be described in conjunction with one embodiment thereof shown in FIGS. 4 and 5. In the figures, a shear frame 19 supporting an upper blade 4 and a lower blade 5 has a substantially a C-shape configuration having a pendant portion 19a at the upper jaw of the opening, and a connecting rod 21 guided for vertical movement by an upper bearing 20 is internally disposed in the pendant portion 19a. Reference numeral 22 designates a cylinder connected to the connecting rod 21 for moving the connecting rod 21 up and down. In the lower jaw 19b of the opening of the shear frame 19, a lower bearing 23 is disposed for receiving the lowered connecting rod 21. Further, the lower jaw 19b is also provided with a lock pin 25 that is engageable and disengageable by a lock pin cylinder 24 with a lateral hole 21a formed sidewardly in the connecting rod 21.

With the above described arrangement, during the cutting operation, in which the connecting rod 21 is in a lowered position and locked by the lock pin 25, the cutting reaction force is resisted by the shear frame 19 itself. FIG. 5 illustrates the condition in which the lock pin 25 is receded and the connecting rod 21 is released from the locked position and is in its upper position. By causing the shear frame 19 to be opened in this manner, the shear frame 19 can pass about the outside of the welding workpiece when it is to be moved.

As described above, since the shear frame 19 itself is provided with a mechanism for resisting the cutting reaction force, the mechanism can accurately be positioned, enabling the apparatus to be small-sized and light-weight.

Figures 6, 7:
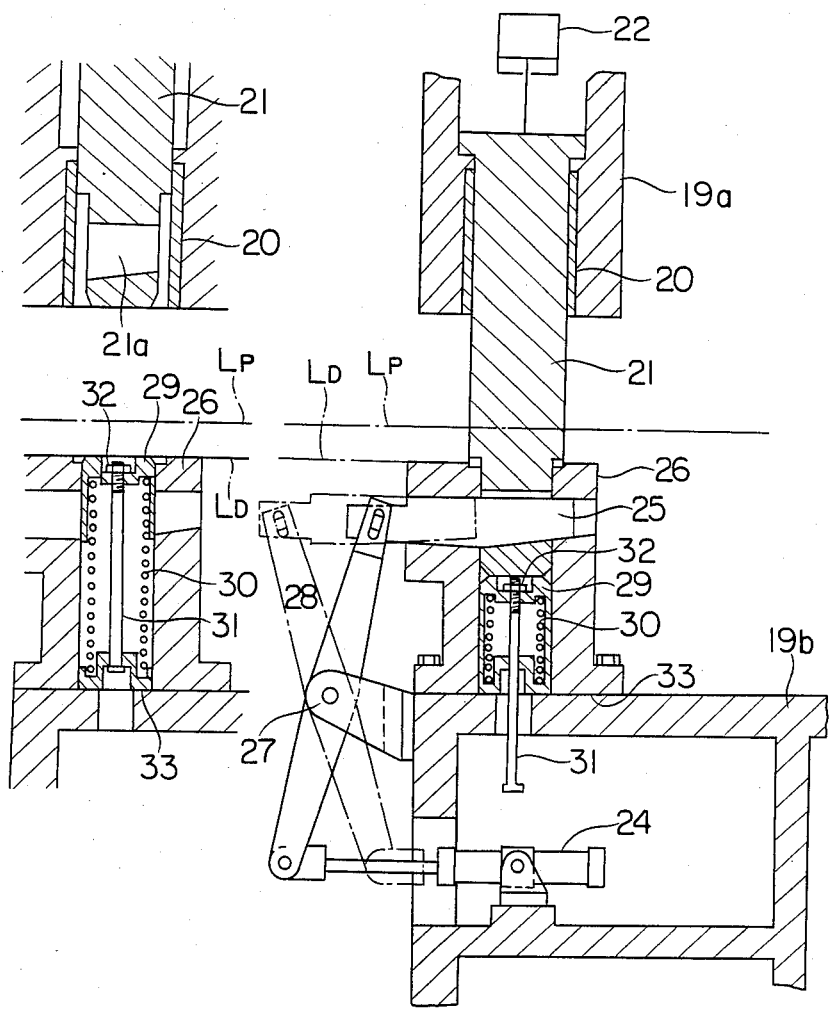
FIG. 6 is a sectional front view of a main portion of another embodiment of the present invention.
FIG. 7 is a sectional front view of one portion for explaining the operation.

FIGS. 6 and 7 illustrate another embodiment. In order to resist the cutting reaction force by the shear frame 21 itself by the use of the connecting rod 21 and the lock pin 25, the engaging portions between the lateral hole 21a and the lock pin 25 must be arranged to have no gap therebetween when the lock pin 25 is inserted into the lateral hole 21a of the connecting rod 21. If the lock pin 25 is of an oval cross-section, a gap may be formed between the lateral hole 21a and the lock pin 25. This embodiment is made taking the above point in mind, and utilizes a lateral hole 21a that is machined to become a wedge hole having a slope at the lower portion thereof and a lock pin 25 which has a wedge-shape complementary to the wedge hole. This lock pin 25 is guided by a lower guide 26 mounted to the lower jaw 19b of the shear frame 19 and is driven by the lock pin cylinder 24 through a bracket 27 and a link 28 mounted to the lower jaw 19b. The lock pin 25 is inserted into the lateral hole 21a after the connecting rod 21 is inserted into the lower guide 26 as shown in FIG. 6. The reference character $L_D$ designates a die line of the clamp die, and the reference character $L_P$ designates a pass line of the welding workpiece.

As described above, since the connecting rod 21 and the lock pin 25 are engaged by a wedge action, the connecting rod 21 is caused by the lock pin 25 to engage the pendant portion 19a and the lower jaw 19b with no gap therebetween.

Thus, the connecting portions of the connecting rod 21 and the lock pin 25 are free from abrasion due to impacts during the cutting operation, increasing the durability. Furthermore, even when some abrasion exists, the gap is eliminated by increasing the insertion stroke of the lock pin 25.

Reference numeral 29 is a cover which, as shown in FIG. 7, closes the lower guide 26 to prevent the entry of scale, dust, etc. into the lower guide 26 when the connecting rod 21 is in the upper position. This cover 29 is pushed up by a spring 30 which is guided by the hole in the guiding portion of the lower guide 26 for guiding the connecting rod 21. The position of the cover 29 is adjustable by a nut 32 at the top of a stop bar 31. The spring 30 is supported by a spring washer 33, and the cover 29 is pushed down against the spring 30 as shown in FIG. 6 by the connecting rod 21 inserted into the lower guide 26.

The provision of the cover 29 prevents the entry of the scale, dust or the like into the guiding surfaces of the lower guide 26, the connecting rod 21 and the lock pin 25, thereby preventing abnormal abrasions of the guiding surfaces.

While the description has been made in conjunction with embodiments of a cutter for use in a laser welding apparatus, the present invention is also applicable to a welding apparatus to which a similar function is desired such as a plasma arc welding apparatus, a main shim welding apparatus, etc., to obtain similar advantages.

We claim:

1. A cutter for a welding apparatus in which a welding workpiece is cut by being moved into a welding position in said apparatus, said cutter comprising in combination:
    a C-shaped shear frame having an upper pendent portion and a lower jaw separated by an opening which forms the gap in the C-shape of the shear frame;
    means (1) for moving said shear frame between welding and non-welding positions;
    a mechanism spanning said upper pendent portion and said lower jaw for resisting the reactive force created by said upper and lower blades during cutting;
    a lock pin housed in said lower jaw and movable between lock and unlock positions; and
    a lateral hole in a free end of said mechanism for receiving said lock pin in its locked position, thereby retaining said mechanism in a position spanning said upper pendent portion and said lower jaw.

2. A cutter as set forth in claim 1 wherein said mechanism comprises a connecting rod located in said upper pendent portion for movement along its longitudinal axis so as to span said gap during cutting and said cutter including means for retracting said connecting rod into said upper pendent portion when said shear frame is moved by means (1).

3. A cutter as set forth in claim 2 wherein a recess in the lower jaw of said shear frame receives a free end of said connecting rod which includes said lateral hole.

4. A cutter as set forth in claim 3 wherein a cover is disposed in said recess of said lower jaw for protecting said recess from receiving dust or the like when said connecting rod is withdrawn from the recess.

5. A cutter as set forth in claim 4 wherein said cover is biased by a spring to close the recess and when the connecting rod is inserted into the recess the cover yields to the rod, thereby causing compression of said spring.

6. A cutter as set forth in claim 1 wherein said lateral hole and lock pin are machined to have complementary wedge shapes so that the lock pin engages said hole without a gap.

7. A cutter as set forth in claim 6 wherein a cylinder is provided for driving by way of a linkage said lock pin along a stroke length which positively engages the pin with said lateral hole.

8. A cutter for a welding apparatus in which a welding workpiece is cut by being moved into a welding position in said apparatus, said cutter comprising in combination:
    a C-shaped shear frame having an upper pendent portion and a lower jaw separated by an opening which forms the gap in the C-shape of the shear frame;
    means (1) for moving said shear frame between welding and non-welding positions;
    a connecting rod spanning said opening;
    a means (2) for retracting said connecting rod into said upper pendent portion when said shear frame is moved by means (1); and
    a recess in said lower jaw of said shear frame for receiving a free end of said connecting rod when said rod spans said opening.

9. A cutter as set forth in claim 8 wherein a lock pin in said lower jaw is received by a lateral hole in said connecting pin so as to lock said connecting pin in a position spanning said opening.

10. A cutter as set forth in claim 9 wherein said lateral hole and lock pin are machined to have complementary wedge shapes so that the lock pin engages said hole without a gap.

* * * * *